Patented Dec. 4, 1928.

1,693,746

UNITED STATES PATENT OFFICE.

JOSEPH G. DAVIDSON, OF YONKERS, NEW YORK, ASSIGNOR TO CARBIDE AND CARBON CHEMICALS CORPORATION, A CORPORATION OF NEW YORK.

COMPOSITION CONTAINING CELLULOSE DERIVATIVES.

No Drawing.  Application filed April 29, 1926. Serial No. 105,577.

The invention relates to compositions containing cellulose derivatives, such as the esters or ethers, of which nitrocellulose, ethyl cellulose, and cellulose acetate are examples. Some of the compositions comprised within the invention are useful as lacquers for depositing a film of cellulose derivative while others are plastic and adapted for molding.

The compounds embraced by the invention contain a cellulose derivative of the class referred to and a solvent therefor. It will be understood that in this art solvents of various degrees of volatility are required and that these solvents are classified according to their boiling points as "low boilers", "medium boilers", "high boilers", "plasticizers", etc. Some solvents are employed which are solid at ordinary temperatures. The solvents to be described have relatively high boiling points and are useful as "high-boilers", "plasticizers", and to replace camphor in colloiding nitrocellulose for the manufacture of plastics.

The solvents embraced by the invention are polyglycols, that is, they are condensation products formed by the combination of two or more molecules of simple glycols with the elimination of water. Examples are:

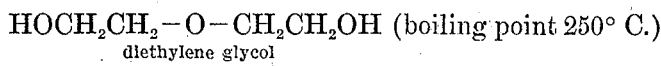
diethylene glycol and

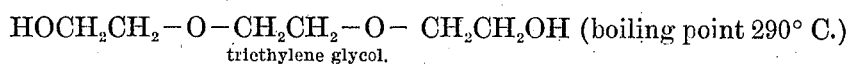
triethylene glycol.

The propylene and higher glycols condense in similar fashion and five and probably more molecules may combine by this process. Compound polyglycols, such as ethylene-propylene glycol, are also of this class. It will be observed that the triglycols have two ether linkages while the higher condensation products have more.

The polyglycols are in general miscible with common organic solvents and with water. When used as solvents for cellulose derivatives they will practically always be mixed with supplementary solvents, as is customary in the art, to modify the boiling range or other properties of the composition or to reduce the cost of making it. The possibilities in this direction are manifestly too various to permit their detailed discussion here. It may be said, however, that many of the solvents included in the invention are so active that they will stand a very high dilution with cheaper and less active solvents.

The polyglycols are particularly useful in the preparation of lacquers and plastics from nitrocellulose.

I claim:

1. A new composition of matter containing a cellulose derivative of the ether-ester class and a solvent therefor comprising a polyglycol.

2. A new composition of matter containing nitrocellulose and a solvent therefor comprising a polyglycol.

3. A new composition of matter containing nitrocellulose and a solvent therefor comprising a polyethylene glycol.

4. A new composition of matter containing nitrocellulose and a solvent therefor comprising a polyglycol having a plurality of ether linkages.

5. A new composition of matter containing nitrocellulose and a solvent therefor comprising a polyethylene glycol having a plurality of ether linkages.

In testimony whereof, I affix my signature.

JOSEPH G. DAVIDSON.